US012431008B2

(12) United States Patent
Wolf et al.

(10) Patent No.: US 12,431,008 B2
(45) Date of Patent: Sep. 30, 2025

(54) PERFORMING A SELF-CLEAN OF A FIRE SENSING DEVICE

(71) Applicant: Honeywell International Inc., Charlotte, NC (US)

(72) Inventors: Benjamin H. Wolf, Leicester (GB); Christopher Dearden, Melton Mowbray (GB); Michael Barson, Nuneaton (GB); Kamal Raja Ganesan, Chennai (IN); Vardhaman Babu Jarale, Bengaluru (IN); Barath Murugavel, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/866,800

(22) Filed: Jul. 18, 2022

(65) Prior Publication Data

US 2024/0021069 A1 Jan. 18, 2024

(51) Int. Cl.

*G08B 29/04* (2006.01)
*B08B 5/02* (2006.01)
*B08B 13/00* (2006.01)

(52) U.S. Cl.

CPC .............. *G08B 29/043* (2013.01); *B08B 5/02* (2013.01); *B08B 13/00* (2013.01)

(58) Field of Classification Search

CPC .......... G08B 29/043; B08B 5/02; B08B 13/00
See application file for complete search history.

(56) References Cited

U.S. PATENT DOCUMENTS 4,617,560 A 10/1986 Gutmann
6,184,537 B1 * 2/2001 Knox .................. G08B 17/107 340/630
6,285,290 B1 9/2001 Kouznetsov
8,294,587 B2 10/2012 Danz et al.
9,679,468 B2 6/2017 Piccolo, III
11,024,154 B1 6/2021 Lang et al.
11,127,284 B1 9/2021 Barson et al.
11,132,891 B2 9/2021 Dearden et al.
2010/0328082 A1 12/2010 Danz
2012/0133518 A1 * 5/2012 Russwurm ............ G08B 29/18 340/628
2012/0154161 A1 6/2012 Knox
(Continued)

FOREIGN PATENT DOCUMENTS

CN 112503552 A * 3/2021 ................ F23J 1/00
GB 2343946 A 5/2000

OTHER PUBLICATIONS

Machine translation of CN-112503552-A (Year: 2021).*

*Primary Examiner* — Erin F Bergner
(74) *Attorney, Agent, or Firm* — Brooks, Cameron & Huebsch, PLLC

(57) ABSTRACT

Devices, methods, and systems for performing a self-clean of a fire sensing device are described herein. One device includes an air movement device and a controller configured to receive a command to perform a self-clean of the fire sensing device and cause the air movement device to activate to perform the self-clean responsive to receiving the command to self-clean, wherein the air movement device is configured to activate for a particular period of time to remove unwanted particles from the fire sensing device.

16 Claims, 6 Drawing Sheets

(56) References Cited

U.S. PATENT DOCUMENTS

| | | | | |
|---|---|---|---|---|
| 2012/0235822 | A1* | 9/2012 | Barson | G08B 17/113 340/630 |
| 2016/0042638 | A1* | 2/2016 | Sangha | G08B 29/26 340/628 |
| 2016/0320292 | A1* | 11/2016 | Stamer | G02B 27/0006 |
| 2017/0032661 | A1* | 2/2017 | Moffa | G08B 29/145 |
| 2019/0005805 | A1 | 1/2019 | Griffith | |
| 2022/0058929 | A1 | 2/2022 | Dearden et al. | |

* cited by examiner

PERFORMING A SELF-CLEAN OF A FIRE SENSING DEVICE

TECHNICAL FIELD

The present disclosure relates generally to devices, methods, and systems for performing a self-clean of a fire sensing device.

BACKGROUND

Large facilities (e.g., buildings), such as commercial facilities, office buildings, hospitals, and the like, may have a fire alarm system that can be triggered during an emergency situation (e.g., a fire) to warn occupants to evacuate. For example, a fire alarm system may include a fire control panel and a plurality of fire sensing devices (e.g., smoke detectors), located throughout the facility (e.g., on different floors and/or in different rooms of the facility) that can sense a fire occurring in the facility and provide a notification of the fire to the occupants of the facility via alarms.

Maintaining the fire alarm system can include regular cleaning and testing of fire sensing devices mandated by codes of practice in an attempt to ensure that the fire sensing devices are functioning properly. However, since tests and/or cleaning may only be completed periodically, there is a risk that faulty and/or dirty fire sensing devices may not be discovered quickly or that tests and/or cleaning may not be carried out on all the fire sensing devices in a fire alarm system.

Testing and/or cleaning each fire sensing device can be time consuming, expensive, and disruptive to a business. For example, a maintenance engineer is often required to access fire sensing devices which are located in areas occupied by building users or parts of buildings that are often difficult to access (e.g., elevator shafts, high ceilings, ceiling voids, etc.). As such, the maintenance engineer may take several days and several visits to complete testing and/or cleaning of the fire sensing devices, particularly at a large site. Additionally, it is often the case that many fire sensing devices never get tested and/or cleaned because of access issues.

Over time a fire sensing device can become dirty with dust and debris. A clogged fire sensing device can prevent air and/or particles from passing through the fire sensing device to sensors in the fire sensing device, which can prevent a fire sensing device from detecting smoke, fire, and/or carbon monoxide.

In some instances, a fire sensing device can mistake dust for smoke and trigger a false alarm. False alarms can decrease trust in the fire alarm system and minimize actions taken in the event of a real fire because people are accustomed to the fire sensing device raising false alarms. False alarms can put undue burden on maintenance engineers who must check triggered fire sensing devices. Also, equipment (e.g., manlifts) used by the maintenance engineers to check triggered fire sensing devices may succumb to unnecessary wear due to false alarms.

DETAILED DESCRIPTION

Figure 1:
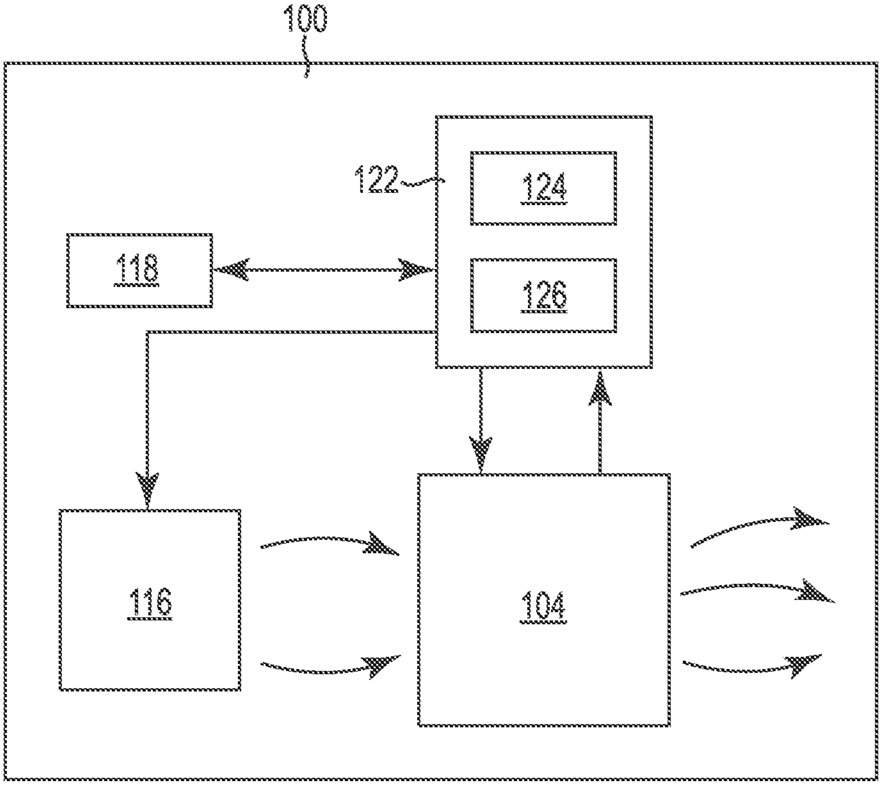
FIG. 1 illustrates a block diagram of a self-clean function of a fire sensing device in accordance with an embodiment of the present disclosure.

Devices, methods, and systems for performing a self-clean of a fire sensing device are described herein. One fire sensing device includes an air movement device and a controller configured to receive a command to perform a self-clean of the fire sensing device and cause the air movement device to activate to perform the self-clean responsive to receiving the command to self-clean, wherein the air movement device is configured to activate for a particular period of time to remove unwanted particles from the fire sensing device.

In contrast to previous fire sensing devices in which a person (e.g., maintenance engineer and/or operator) would have to manually inspect a fire sensing device for particles (e.g., dust) and/or clean a fire sensing device in accordance with the present disclosure can perform a particle detection and/or a self-clean. As used herein, a self-clean of a fire sensing device can include and/or refer to the fire sensing device removing unwanted particles from within itself. For example, the fire sensing device can utilize an air movement device to dislocate particles in an optical scatter chamber of the fire sensing device and/or remove particles from the optical scatter chamber responsive to receiving a command. Accordingly, fire sensing devices in accordance with the present disclosure may be inspected and/or cleaned without manual inspection and/or cleaning by a person, which can reduce the cost, time, and difficulty of inspecting and cleaning the devices.

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 illustrates a block diagram of a self-clean function of a fire sensing device 100 in accordance with an embodiment of the present disclosure. The fire sensing device 100 includes a controller (e.g., microcontroller) 122, an optical scatter chamber 104, and an air movement device 116.

The controller 122 can include a memory 124 and a processor 126. Memory 124 can be any type of storage medium that can be accessed by processor 126 to perform various examples of the present disclosure. For example, memory 124 can be a non-transitory computer readable medium having computer readable instructions (e.g., computer program instructions) stored thereon that are executable by processor 126 to perform a self-clean of fire sensing device 100 in accordance with the present disclosure. For instance, processor 126 can execute the executable instructions stored in memory 124 to receive (e.g., via a network, as will be further described herein) a command to perform a self-clean of the fire sensing device 100 and cause the air movement device 116 to activate to perform the self-clean responsive to receiving the command to self-clean. The command can be received from, for example, a computing device or a fire control panel.

The air movement device 116 can be a fan and can activate for a particular period of time to remove particles from the fire sensing device. The controller 122 can cause the air movement device 116 to deactivate after the particular period of time has passed and transmit (e.g., via a network, as will be further described herein) a report (e.g., message) the self-clean was performed to a computing device or a fire control panel (e.g., the same computing device or fire control panel from which the command to perform the self-clean was received) responsive to causing the air movement device 116 to deactivate.

In some examples, the optical scatter chamber 104 can measure a quantity of particles therein. The controller 122 can compare the measured quantity of particles to a baseline quantity of particles and cause the air movement device 116 to activate to perform the self-clean responsive to the measured quantity of particles being greater than the baseline quantity of particles.

The memory 124 can store the baseline quantity of particles, the measured quantity of particles, and/or a different measured quantity of particles. In some examples, the measured quantity can be stored in memory 124 as the baseline quantity of particles if, for example, the measured quantity of particles is the first (e.g., initial) measured quantity of particles by the fire sensing device 100. If the fire sensing device 100 already has a baseline quantity of particles, then the measured quantity of particles can be stored in memory 124 as a measured quantity of particles.

Figure 2:
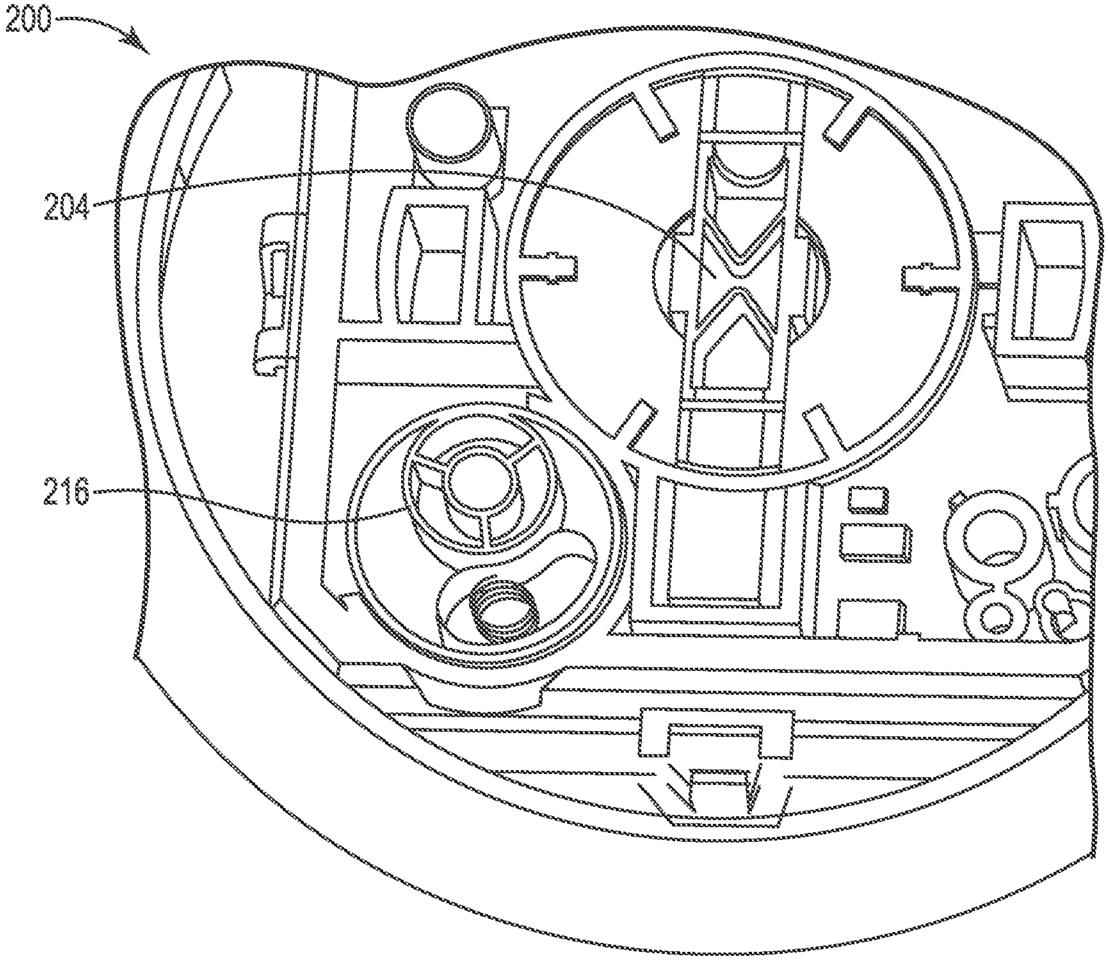
FIG. 2 illustrates a portion of an example of a fire sensing device in accordance with an embodiment of the present disclosure.

FIG. 2 illustrates a portion of an example of a fire sensing device 200 in accordance with an embodiment of the present disclosure. The fire sensing device 200 can correspond to the fire sensing device 100 of FIG. 1 and can be, but is not limited to, a fire and/or smoke detector of a fire control system.

A fire sensing device 200 can sense a fire occurring in a facility and trigger a fire response to provide a notification of the fire to occupants of the facility. A fire response can include visual and/or audio alarms, for example. A fire response can also notify emergency services (e.g., fire departments, police departments, etc.) In some examples, a plurality of fire sensing devices can be located throughout a facility (e.g., on different floors and/or in different rooms of the facility).

As shown in FIG. 2, fire sensing device 200 can include an optical scatter chamber 204 and an air movement device 216, which can correspond to the optical scatter chamber 104 and the air movement device 116 of FIG. 1, respectively. Although the air movement device 216 is illustrated as a fan in FIG. 2, any device capable of removing dust from the optical scatter chamber 204 can be used. For example, a variable airflow generator or a shaker device could be used instead of and/or in combination with a fan as the air movement device 216.

The air movement device 216 can control the airflow through the fire sensing device 200, including the optical scatter chamber 204. For example, the air movement device 216 can move particles, gases, and/or aerosol from a first end of the fire sensing device 200 to a second end of the fire sensing device 200. The air movement device 216 can start responsive to a command and can stop responsive to a command and/or after a particular period of time.

A fire sensing device 200 can automatically or upon command perform a self-clean of (e.g., contained within) the fire sensing device 200. The self-clean can detect particles and/or clean the fire sensing device without inspection/or cleaning by a person. The self-clean can include activating the air movement device 216 of the fire sensing device 200 at a first speed for a first period of time, measuring a quantity of particles in the optical scatter chamber 204 of the fire sensing device 200 after the first period of time has passed, comparing the measured quantity of particles to a baseline quantity of particles, and activating the air movement device 216 at a second speed for a second period of time to remove particles from the optical scatter chamber 204 responsive to the measured quantity of particles being greater than the baseline quantity of particles.

Figure 3:
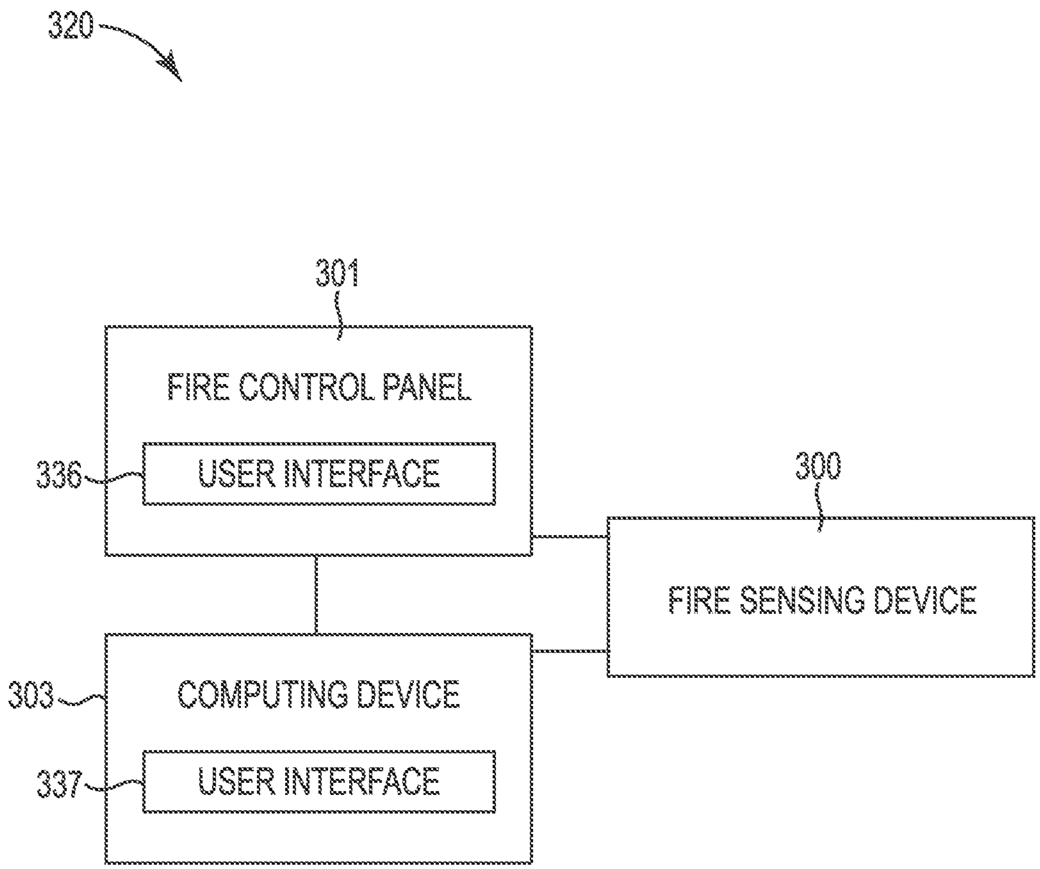
FIG. 3 illustrates a block diagram of a self-clean function of a fire alarm system in accordance with an embodiment of the present disclosure.

FIG. 3 illustrates a block diagram of a self-clean function of a fire alarm system 320 in accordance with an embodiment of the present disclosure. The fire alarm system 320 can include a fire sensing device 300, a fire control panel 301, and a computing device 303. Fire sensing device 300 can be, for example, fire sensing device 100 and/or 200 previously described in connection with FIGS. 1 and 2, respectively.

The fire control panel 301 can be a monitoring device, a fire detection control system, and/or a cloud computing device of the fire alarm system 320. The fire control panel 301 can be configured to send commands to and/or receive reports from a fire sensing device 300 via a wired or wireless network (not shown in FIG. 3 for simplicity and so as not to obscure embodiments of the present disclosure). For example, the fire sensing device 300 can transmit a report a self-clean was performed to the fire control panel 301 responsive to causing an air movement device (e.g., air movement device 116 and/or 216 of FIGS. 1 and 2, respectively) to deactivate and/or comparing a measured quantity of particles to a baseline quantity of particles.

Fire alarm system 320 can include, and the fire control panel 301 can receive reports from, a number of fire sensing devices analogous to fire sensing device 300. For example, the fire control panel 301 can receive reports from each of a number of fire sensing devices analogous to fire sensing device 300 and transmit commands based on the reports from each of the number of fire sensing devices.

In a number of embodiments, the fire control panel 301 can include a user interface 336. The user interface 336 can be a GUI that can provide and/or receive information to and/or from a user and/or the fire sensing device 300. The user interface 336 can display messages and/or data received from the fire sensing device 300. For example, the user interface 336 can alert a user to a dirty fire sensing device 300, a clean fire sensing device 300, and/or a fire sensing device 300 that performed a self-clean.

The networks described herein can be a network relationship through which fire sensing device 300 and/or fire control panel 301 can communicate with each other. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from and transmit information to fire sensing device 300 and/or fire control panel 301 via a wired or wireless network.

As used herein, a "network" can provide a communication system that directly or indirectly links two or more computers and/or peripheral devices and allows a fire control panel 301 to access data and/or resources on a fire sensing device 300 and vice versa. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

In some examples, the network can be used by the fire sensing device 300 and/or the fire control panel 301 to communicate with a computing device 303. The computing device 303 can be a personal laptop computer, a desktop computer, a mobile device such as a smart phone, a tablet, a wrist-worn device, and/or redundant combinations thereof, among other types of computing devices. The computing device 303 can receive reports from a number of fire sensing devices analogous to fire sensing device 300 and/or a number of fire control panels analogous to fire control panel 301 and transmit commands based on the reports to one or more of the number of fire sensing devices and/or one or more of the number of fire control panels. For example, the fire sensing device 300 can transmit a report a self-clean was performed to the computing device 303 responsive to causing the air movement device to deactivate and/or comparing a measured quantity of particles to a baseline quantity of particles.

In a number of embodiments, the computing device 303 can include a user interface 337. The user interface 337 can be a GUI that can provide and/or receive information to and/or from a user and/or the fire sensing device 300 and/or the fire control panel 301. The user interface 337 can display messages and/or data received from the fire sensing device 300 and/or the fire control panel 301. For example, the user interface 337 can alert a user to a dirty fire sensing device 300, a clean fire sensing device 300, and/or a fire sensing device 300 that performed a self-clean.

Figure 4:
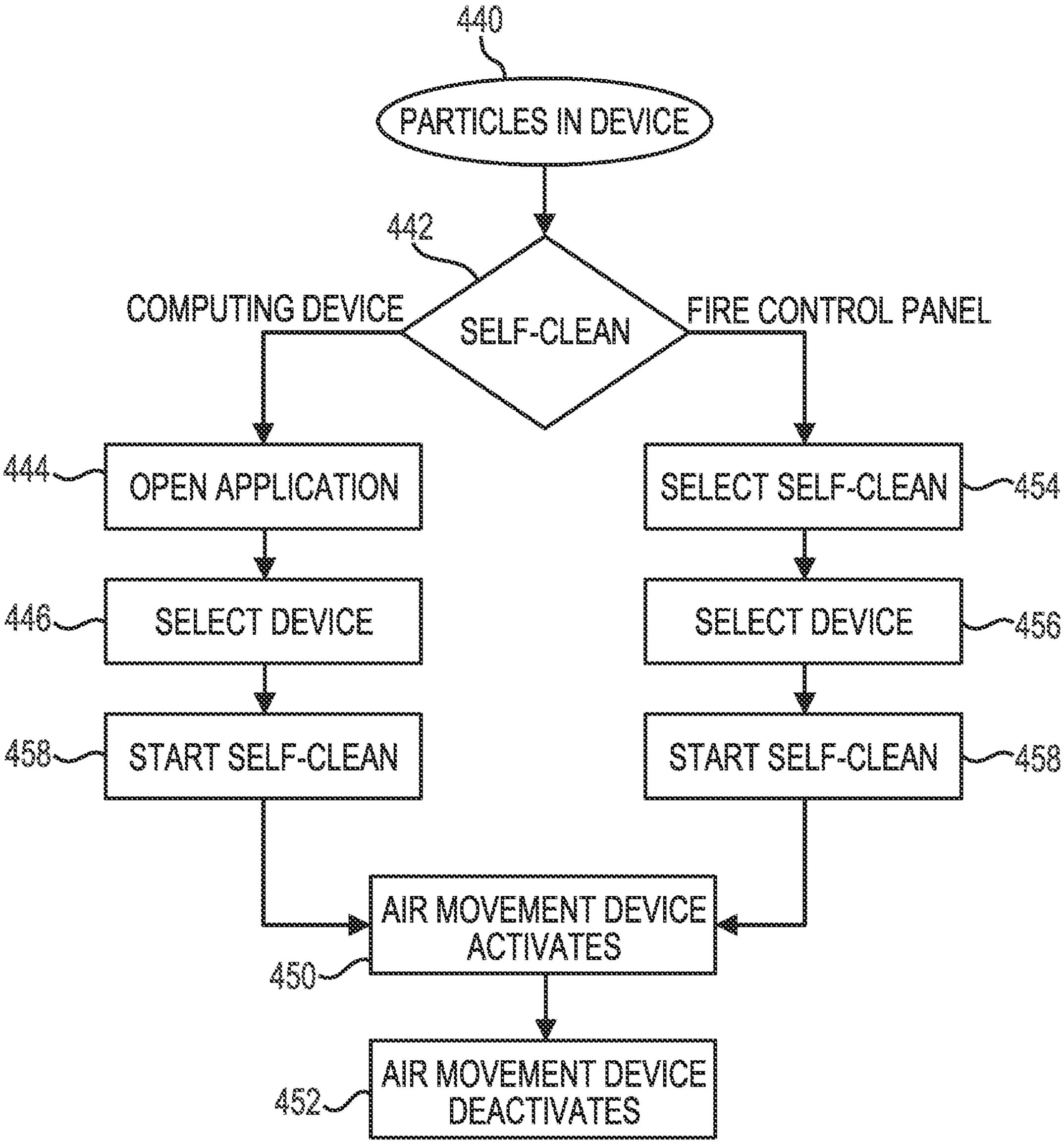
FIG. 4 illustrates a method flow chart associated with self-cleaning a fire sensing device in accordance with an embodiment of the present disclosure.

FIG. 4 illustrates a method flow chart associated with self-cleaning a fire sensing device in accordance with an embodiment of the present disclosure. In some embodiments, the steps of the flow chart illustrated in FIG. 4 can be performed by the fire sensing device, previously described in connection with FIGS. 1, 2, and/or 3.

At 440, the fire sensing device can contain particles. The particles can be dust and/or an insect, for example.

In a number of embodiments, an optical scatter chamber (e.g., optical scatter chamber 104 and/or 204 of FIGS. 1 and 2, respectively) can be configured to measure a quantity of particles inside the optical scatter chamber of the fire sensing device. The optical scatter chamber can include a transmitter light-emitting diode (LED) and a receiver photodiode to measure the quantity of particles within the optical scatter chamber. The fire sensing device can cause an air movement device (e.g., air movement device 116 and/or 216 in FIGS. 1 and 2, respectively) to perform a self-clean and/or transmit a report and/or the measured quantity of particles to the fire control panel (e.g., fire control panel 301 of FIG. 3) and/or the computing device (e.g., computing device 303 of FIG. 3) responsive to the measured quantity of particles being greater than a baseline quantity of particles.

At 442, a user can determine whether a self-clean of the fire sensing device should be performed. The user can determine this from reading the report and/or the measured quantity of particles, seeing the fire sensing device, and/or receiving a periodic reminder, for example. Once the user determines a self-clean is needed, the user can initiate the self-clean via an application on the computing device or the fire control panel.

If the user decides to initiate the self-clean via the computing device, at 444, the user can open an application on the computing device. The user can select the application via a user interface (e.g., user interface 337 in FIG. 3) of the computing device.

In response to the selection of the application, the application can launch on the computing device. The application, via the user interface, can display a number of fire sensing devices as a list and/or the fire sensing devices can be displayed on a map of a facility.

At 446, the user can select a fire sensing device from the list and/or the map (e.g., the computing device can receive a selection to perform the self-clean of the fire sensing device). In a number of embodiments, the user may select a number of fire sensing devices and/or a group of fire sensing devices. Fire sensing devices could be grouped by location, devices with a measured quantity of particles greater than a baseline quantity of particles, last self-cleaned date, type of device, and/or installation date.

Once the user has selected a number of fire sensing devices, the user can select to start the self-clean at 448. In response to the user selecting to start the self-clean, the computing device can transmit a command to perform the self-clean to the selected fire sensing devices, and the air movement device of each of the number of fire sensing devices selected can be activated at 450. The air movement devices can be activated upon the selection to start the self-clean or can be delayed to activate at a particular time, on a particular day, and/or on a particular date. For example, a user may specify within the application that the number of fire sensing devices will be activated at night to prevent disruption to a workday. In a number of embodiments, a user may specify the number of fire sensing devices performing a self-clean periodically and/or responsive to a measured quantity of particles being greater than a baseline quantity of particles.

After a particular period of time has passed since the air movement device was activated, the air movement device can be deactivated at 452. In some examples, the air movement device can be deactivated after measuring the quantity of particles in the optical scatter chamber. An additional quantity of particles can be measured in the optical scatter chamber responsive to deactivating the air movement device, and the additional measured quantity of particles can be compared to the baseline quantity of particles. The additional measured quantity of particles can be transmitted from the fire sensing device to the computing device and/or the fire control panel. The measured quantity of particles and/or the additional measured quantity of particles can be stored in memory of the fire sensing device, the computing device, and/or the fire control panel.

A report can be transmitted that a self-clean was performed to the computing device and/or the fire control panel responsive to causing the air movement device to deactivate and/or responsive to comparing the additional measured quantity of particles to the baseline quantity of particles. The report can also include the additional measured quantity of particles. In some examples, the report can identify the fire sensing device as needing cleaning responsive to the additional measured quantity of particles being greater than the baseline quantity of particles. For example, the fire sensing device may need to perform another self-clean or the fire sensing device may need to be manually cleaned. In some examples, the report can identify the fire sensing device as clean responsive to the additional measured quantity of particles being less than or equal to the baseline quantity of particles.

If the user decides to initiate the self-clean via the fire control panel, at 454, the user can select self-clean via a user interface (e.g., user interface 336 in FIG. 3) of the computing device. In response to the selection of the self-clean, via the user interface, the fire control panel can display a number of fire sensing devices as a list and/or the fire sensing devices can be displayed on a map of a facility.

At 456, the user can select a fire sensing device from the list and/or the map (e.g., the fire control panel can receive a selection to perform the self-clean of the fire sensing device). In a number of embodiments, the user may select a number of fire sensing devices and/or a group of fire sensing devices.

Once the user has selected a number of fire sensing devices, the user can select to start the self-clean at 458. In response to the user selecting to start the self-clean, the fire control panel can transmit a command to perform the self-clean to the selected fire sensing devices, and the air movement device of each of the number of fire sensing devices selected can be activated at 450 and the air movement device can be deactivated at 452, as previously discussed.

Figure 5:
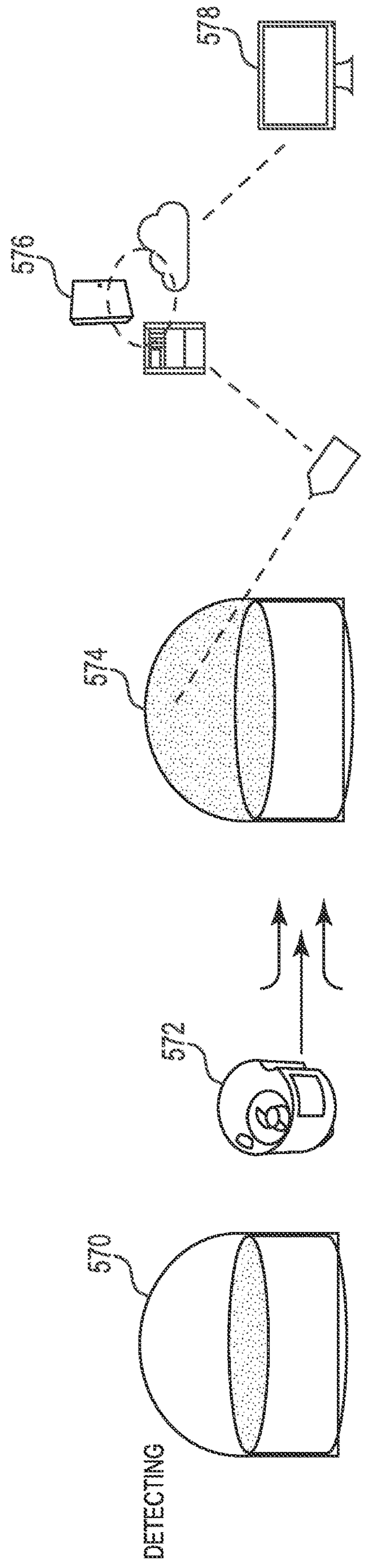
FIG. 5 illustrates a flow diagram of a particle detection function of a fire sensing device in accordance with an embodiment of the present disclosure.

FIG. 5 illustrates a flow diagram of a particle detection function of a fire sensing device (e.g., fire sensing device 100, 200, and 300 of FIGS. 1, 2, and 3, respectively) in accordance with an embodiment of the present disclosure. At 570, particles may be in an optical scatter chamber (e.g., optical scatter chamber 104 and/or 204 of FIGS. 1 and 2, respectively) of a fire sensing device.

At 572, an air movement device (e.g., air movement device 116 and/or 216 of FIGS. 1 and 2, respectively) can be activated to pulse airflow into the optical scatter chamber to disrupt particles that may be in the optical scatter chamber. For particle detection, the air movement device can be activated at a first speed and/or for a first period of time.

Responsive to the air movement device being activated, the optical scatter chamber can measure a quantity of particles therein at 574. The optical scatter chamber can include a transmitter LED and a receiver photodiode to measure the quantity of particles within the optical scatter chamber.

At 576, the measured quantity of particles can be received at a cloud via a network, as previously discussed in connection with FIG. 3. In a number of embodiments, a computing device (e.g., computing device 303 of FIG. 3) can receive the measured quantity of particles via the cloud at 578. For example, a user can open an application via the computing device and the application can provide the measured quantity of particles. In some examples, a report can be provided that the fire sensing device needs to be cleaned manually. The report can identify the fire sensing device needs to be manually cleaned responsive to the measured quantity of particles being greater than a baseline quantity of particles.

Figure 6:
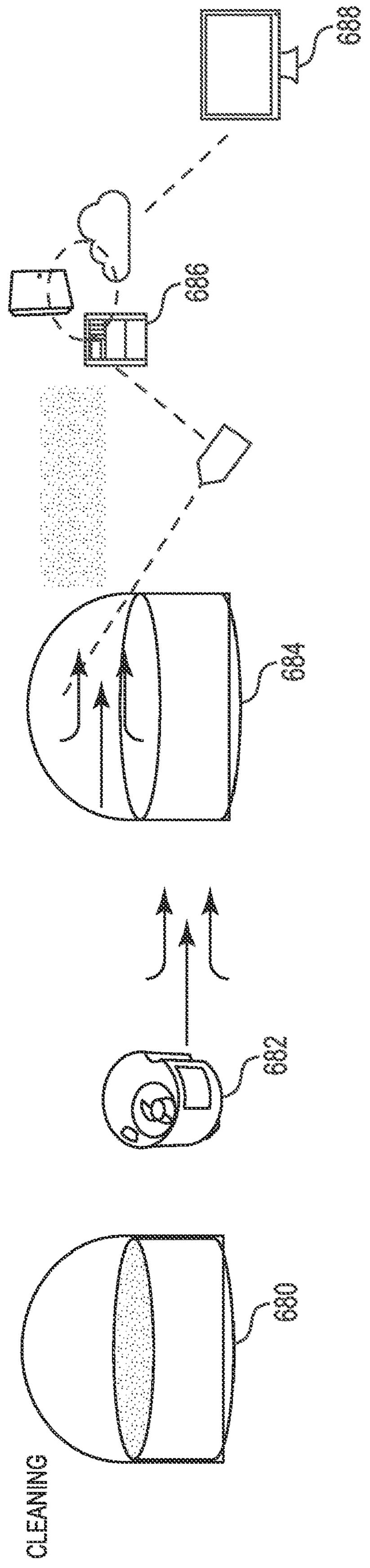
FIG. 6 illustrates a flow diagram of a self-clean function of a fire sensing device in accordance with an embodiment of the present disclosure.

FIG. 6 illustrates a flow diagram of a self-clean function of a fire sensing device (e.g., fire sensing device 100, 200, and 300 of FIGS. 1, 2, and 3, respectively) in accordance with an embodiment of the present disclosure. At 680, particles may be in an optical scatter chamber (e.g., optical scatter chamber 104 and/or 204 of FIGS. 1 and 2, respectively) of a fire sensing device.

At 682, an air movement device (e.g., air movement device 116 and/or 216 of FIGS. 1 and 2, respectively) can be activated to pulse airflow into the optical scatter chamber to remove particles that may be in the optical scatter chamber. For particle cleaning, the air movement device can be activated at a second speed and/or for a second period of time. The second speed used for particle cleaning can be a greater speed than the first speed used for particle detection. In a number of embodiments, the second period of time used for particle cleaning can be longer than the first period of time used for particle detection. For example, it may take higher air speed and more time to remove the particles from the optical scatter chamber than to disrupt the particles to measure the quantity of particles.

Responsive to the air movement device being activated, the optical scatter chamber can measure a quantity of particles therein at 684. The optical scatter chamber can include a transmitter LED and a receiver photodiode to measure the quantity of particles within the optical scatter chamber.

At 686, the measured quantity of particles can be received at a cloud via a network, as previously discussed in connection with FIG. 3. In a number of embodiments, a computing device (e.g., computing device 303 of FIG. 3) can receive the measured quantity of particles via the cloud at 688. For example, a user can open an application via the computing device and the application can provide the measured quantity of particles.

Figure 7:
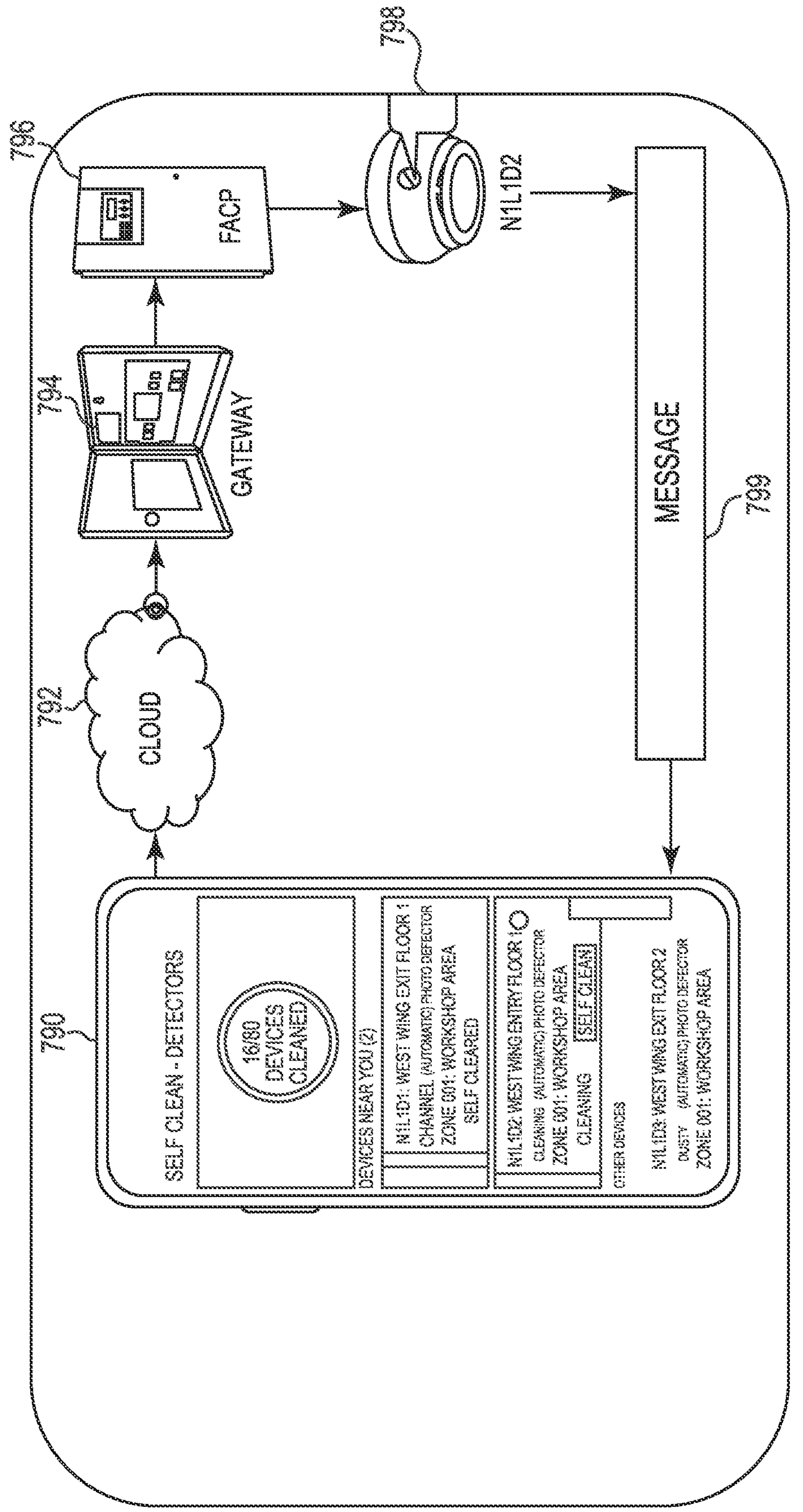
FIG. 7 illustrates a flow diagram of self-clean function of a fire alarm system in accordance with an embodiment of the present disclosure.

FIG. 7 illustrates a flow diagram of self-clean function of a fire alarm system (e.g., fire alarm system 320 in FIG. 3) in accordance with an embodiment of the present disclosure. At 790, an application displayed on a user interface (e.g., user interface 337 in FIG. 3) of a computing device (e.g., computing device 303 in FIG. 3) can display a quantity of a number of fire sensing devices (e.g., fire sensing device 100, 200, and 300 in FIGS. 1, 2, and 3, respectively) cleaned and/or statuses of the number of fire sensing devices. For instance, in the example illustrated in FIG. 7, 16 out of 80 total fire sensing devices have been self-cleaned, fire sensing device “N1L1D1” has been “self-cleaned”, fire sensing device “N1L1D2” is “self-cleaning”, and fire sensing device “N1L1D3” is “dusty”.

The computing device can receive a selection to perform a self-clean of a fire sensing device. For example, fire sensing device “N1L1D2” can be “self-cleaning” responsive to a user selecting a self-clean function for fire sensing device “N1L1D2”. The computing device can transmit a command to the selected fire sensing device (e.g., device “N1L1D2”) perform the self-clean.

At 792, a command from the computing device to perform the self-clean at fire sensing device “N1L1D2” can be received at a cloud. The cloud can transmit the command to a gateway and at 794, the gateway can receive the command. The gateway can transmit the command to a fire control panel and the fire control panel can receive the command at 796. The fire control panel can then transmit the command to the fire sensing device.

At 798 fire sensing device “N1L1D2” can receive the command to perform the self-clean. Responsive to receiving the command to perform the self-clean, the fire sensing device can activate an air movement device (e.g., air movement device 116 and/or 216 in FIGS. 1 and 2, respectively) for a particular period of time to remove particles from the fire sensing device.

At 799, fire sensing device “N1L1D2” can transmit a message to the computing device responsive to performing the self-clean. The computing device can change the status of fire sensing device “N1L1D2” from “cleaning” to “self-cleaned” responsive to receiving the message. The steps 790-799 could be repeated for an additional fire sensing device, for example, fire sensing device “N1L1D3”.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A fire sensing device, comprising:
an optical scatter chamber;
an air movement device; and
a controller configured to:
receive a command to perform a self-clean of the fire sensing device from a computing device located remotely from the fire sensing device responsive to the computing device receiving a selection of the fire sensing device from a list or a map and a selection to perform the self-clean of the fire sensing device;
cause the air movement device to activate to perform the self-clean responsive to receiving the command to self-clean from the computing device located remotely from the fire sensing device, wherein the air movement device is configured to activate for a particular period of time to remove unwanted particles from the optical scatter chamber of the fire sensing device;
measure a quantity of particles in the optical scatter chamber of the fire sensing device after the particular period of time has passed; and
report the fire sensing device as clean to the computing device responsive to the measured quantity of particles being less than or equal to a baseline quantity of particles.

2. The device of claim 1, wherein the controller is configured to:
cause the air movement device to deactivate after the particular period of time has passed; and
transmit a report the self-clean was performed to the computing device or a fire control panel responsive to causing the air movement device to deactivate.

3. The device of claim 1, wherein the controller is configured to:
cause the air movement device to activate to perform the self-clean responsive to the measured quantity of particles being greater than the baseline quantity of particles.

4. The device of claim 1, wherein the controller is configured to transmit the measured quantity of particles to the computing device or a fire control panel.

5. The device of claim 1, wherein the controller is configured to cause the air movement device to activate to perform the self-clean responsive to it being a particular day, time, or date.

6. A method of removing unwanted particles from a fire sensing device, comprising:
receiving, by the fire sensing device, a command to perform a self-clean of the fire sensing device from a computing device located remotely from the fire sensing device responsive to the computing device receiving a selection of the fire sensing device from a list or a map and a selection to perform the self-clean of the fire sensing device;
activating an air movement device of the fire sensing device at a first speed for a first period of time to remove unwanted particles from an optical scatter chamber of the fire sensing device to perform the self-clean responsive to receiving the command to self-clean from the computing device located remotely from the fire sensing device;
measuring a quantity of particles in the optical scatter chamber of the fire sensing device after the first period of time has passed; and
reporting the fire sensing device as clean to the computing device responsive to the measured quantity of particles being less than or equal to a baseline quantity of particles.

7. The method of claim 6, further comprising providing, by the fire sensing device, a report that the fire sensing device needs to be cleaned manually to remove the unwanted particles responsive to the measured quantity of particles being greater than the baseline quantity of particles.

8. The method of claim 6, further comprising activating the air movement device, by the fire sensing device, at a second speed for a second period of time to remove the unwanted particles from the optical scatter chamber responsive to the measured quantity of particles being greater than the baseline quantity of particles, wherein the second speed is greater than the first speed and the second period of time is longer than the first period of time.

9. The method of claim 8, further comprising:

deactivating the air movement device, by the fire sensing device, after measuring the quantity of particles; and measuring an additional quantity of particles in the optical scatter chamber responsive to deactivating the air movement device.

10. The method of claim 9, further comprising transmitting, by the fire sensing device, the additional measured quantity of particles from the fire sensing device to the computing device or a fire control panel.

11. The method of claim 9, further comprising transmitting, by the fire sensing device, a report, wherein the report includes the additional measured quantity of particles.

12. A fire control system, comprising:

a fire sensing device including an air movement device and an optical scatter chamber; and a computing device located remotely from the fire sensing device and configured to:

receive a selection of the fire sensing device from a list or a map and a selection to perform a self-clean of the fire sensing device; and transmit a command to perform the self-clean to the fire sensing device responsive to receiving the selection to perform the self-clean; and wherein the fire sensing device is configured to:

receive the command to perform the self-clean;

activate the air movement device for a particular period of time to remove unwanted particles from the optical scatter chamber of the fire sensing device responsive to receiving the command to perform the self-clean from the computing device located remotely from the fire sensing device;

measure a quantity of particles in the optical scatter chamber of the fire sensing device after the particular period of time has passed; and report the fire sensing device as clean to the computing device responsive to the measured quantity of particles being less than or equal to a baseline quantity of particles.

13. The system of claim 12, wherein the fire sensing device is configured to transmit a message to the computing device responsive to performing the self-clean.

14. The system of claim 12, wherein:

the system includes an additional fire sensing device having an air movement device; and the computing device is configured to:

receive a selection to perform a self-clean of the additional fire sensing device; and transmit a command to perform the additional self-clean.

15. The system of claim 14, wherein the additional fire sensing device is configured to activate its air movement device for the particular period of time to remove unwanted particles from the additional fire sensing device responsive to receiving the command to perform the additional self-clean.

16. The system of claim 12, wherein the computing device is a mobile device.

* * * * *